United States Patent [19]

Berce

[11] 4,032,456
[45] June 28, 1977

[54] FLIP-UP GUTTER SHIELD

[76] Inventor: William E. Berce, 2703 Westmoreland Road, Charlottesville, Va. 22901

[22] Filed: Feb. 26, 1976

[21] Appl. No.: 659,056

[52] U.S. Cl. .................... 210/474; 52/12; 61/14
[51] Int. Cl.² ................ B01D 23/00; E04D 13/04
[58] Field of Search .................... 61/10–13; 210/474, 475, 473, 455; 52/12, 15, 16; 248/48.1; 24/81

[56] References Cited
UNITED STATES PATENTS

| 1,553,426 | 9/1925 | Altenbern et al. ............. 52/15 X |
| 3,053,393 | 9/1962 | McLean ............................ 52/12 X |
| 3,300,911 | 1/1967 | Riddell ............................... 52/16 |
| 3,420,378 | 1/1969 | Turner .............................. 52/12 X |

Primary Examiner—Dennis L. Taylor

[57] ABSTRACT

A mesh cover over a gutter is mounted to a roof by strap hinges. Position guide means are provided on the side of the mesh cover opposite the hinges for positioning the mesh cover during installation.

11 Claims, 5 Drawing Figures

FLIP-UP GUTTER SHIELD

BACKGROUND OF THE INVENTION

This invention relates to a flip-up gutter shield which prevents leaves and the like from collecting in a gutter, yet which may be moved to a position away from the gutter for servicing of the gutter.

It is well known to provide hinge-mounted mesh covers over a gutter in order to prevent leaves and the like from collecting in the gutter. The hinges are generally connected to the outer edge of the gutter and the opposite edge of the screen may be flipped-up from its usual position along the roof. These gutter shields have several disadvantages. For example, because some debris will always pass through the mesh screen, it is necessary to periodically clean the inside of the gutter. To do so, a person must reach over the flipped-up screen from his already precarious position on a ladder. It is therefore an object of this invention to provide a flip-up gutter shield which, when in the flipped-up position, will be completely out of the way of the person servicing the gutter.

Another disadvantage of the above-mentioned gutter shields is that in the event of any major servicing, for example painting or replacement of the gutter, the shield must be completely dismounted. It is therefore an object of this invention to provide a flip-up gutter shield which, when in the flipped-up position, is totally independent of the gutter, thereby permitting servicing of the gutter without interference from the mesh cover.

In the past, specially designed hinge connectors have been required for the various outer lip designs of gutters. It is therefore another object of this invention to provide a flip-up gutter shield which may be easily used with any gutter design.

It is another object of this invention to provide a simply installed mesh cover.

It is a further object of this invention to provide a flip-up gutter shield which may be easily constructed of plastic, metal, or a combination of the two.

SUMMARY OF THE INVENTION

A flip-up gutter shield comprises a mesh cover mounted by hinge means to a roof. Guide means are provided along the side of the mesh cover opposite the hinge means so that side may be easily positioned over, but not beyond, the outer edge of the gutter.

BRIEF DESCRIPTION OF THE DRAWINGS

The foregoing and other objects, features, and advantages of the invention will be apparent from the following more particular description of preferred embodiments of the invention as illustrated in the accompanying drawings in which like reference characters refer to the same part throughout the different views. The drawings are not necessarily to scale, emphasis instead being placed upon illustrating the principles of the invention.

DESCRIPTION OF THE PREFERRED EMBODIMENTS OF THE INVENTION

Figure 1:
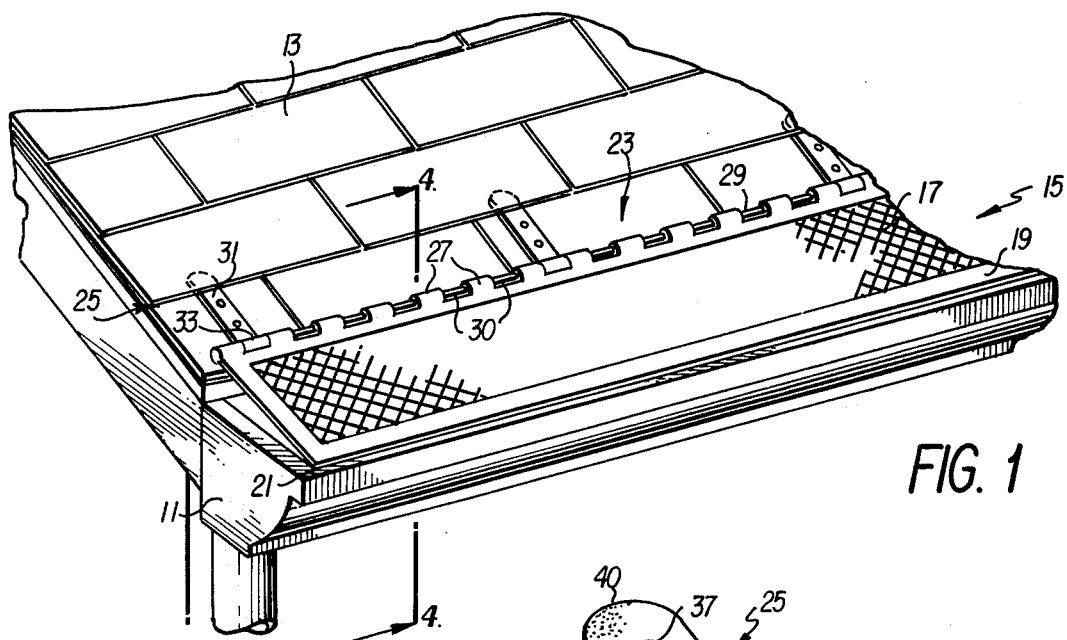
FIG. 1 is an isometric view of an embodiment of the present invention in position over a gutter.

A preferred embodiment of the invention is shown in FIG. 1 with reference to a gutter 11 adjacent a roof 13. A gutter shield, indicated generally at 15, comprises a mesh section 17 bordered by a solid frame 19. The outer edge of the frame 19 rests on an edge 21 of the gutter 11. The mesh cover 17 and solid frame 19 are mounted to the roof 13 by means of a rod 23 and hinge means 25. In this respect, the illustrated embodiment is fabricated from molded plastic so that the rod 23 is a single piece including both pin and loop portions. That is, the rod 23 comprises alternating raised portions 27 (corresponding to loops on a conventional hinge) and recessed portions 29 (corresponding to a pin in a conventional hinge).

Figure 2:
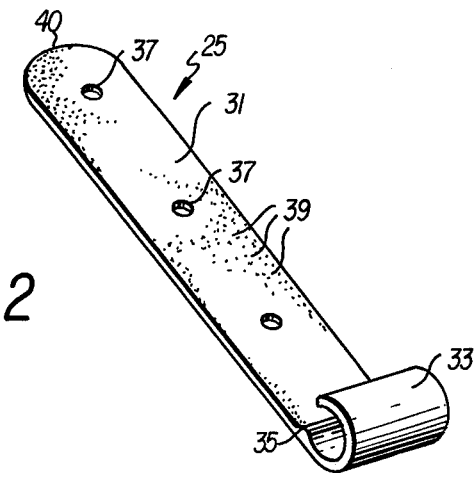
FIG. 2 is a magnified isometric view of the hinge means used in the gutter shield of FIG. 1.
Figure 3:
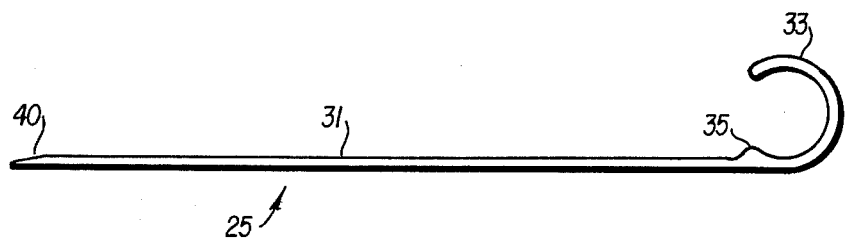
FIG. 3 is a side view of the hinge means of FIG. 2.

The raised portions 27 are integral with the inside edge of frame 19 which includes notches 30 adjacent each recessed portion to accomodate loops 33 on the hinged portion 25 as will now be described. That is, each hinge means 25, as shown in FIGS. 2 and 3, comprises a strap 31 and a looped hinge or clamp portion 33 formed at one end thereof. Prior to mounting of the strap 31 to the roof, looped portion 33 is clamped around any one of the recessed or pin-like portions 29 of rod 23. Raised portion 35 (FIG. 3) is provided on the hinge means 25 in order to better seat the recessed pin-like portion 29 within the loop 33.

Nail holes 37 are provided in the hinge strap 31 for mounting of the strap to roof 13. Alternatively, strap 31 may be secured to the roof by an adhesive. To facilitate in this latter method of mounting the hinge strap, perforations 39 are provided at random throughout the strap.

The hinge strap may be slid partially under a shingle prior to securing it to the roof. To facilitate this, the end 40 of strap 31 is both rounded and beveled.

Figure 4:
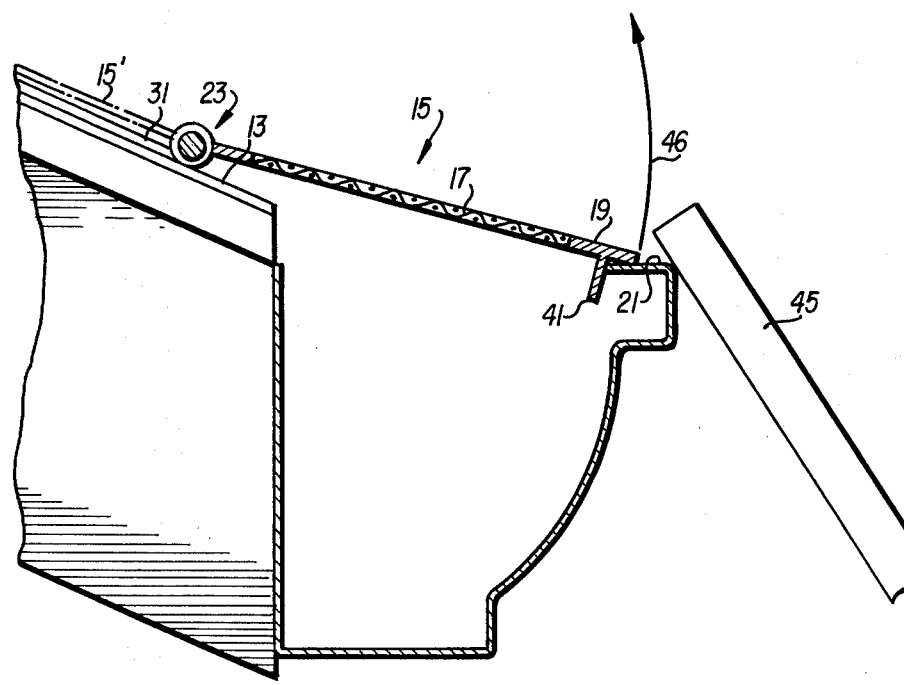
FIG. 4 is a magnified cross-sectional view of the gutter shield of FIG. 1 taken along line 4—4.

Referring to FIG. 4, nail-like projections 41 are provided along the length of the outer edge of frame 19. Projections 41 serve as guide means as will be explained below.

Figure 5:
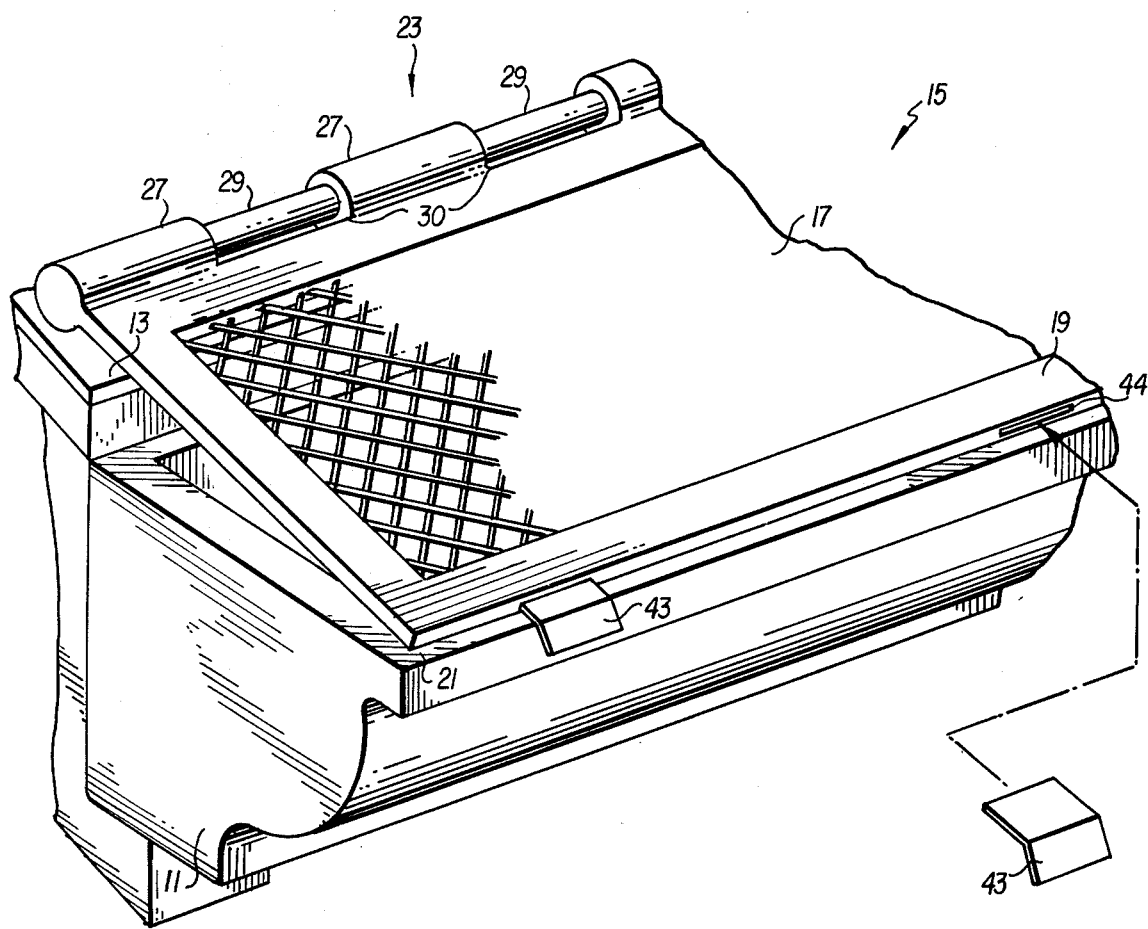
FIG. 5 is an isometric view of a further embodiment of the invention.

As an alternative to projections 41, tabs 43 are provided in FIG. 5.

It is preferred that the rod 23, mesh 17 and frame 19 be made of molded plastic although any number of materials such as metal are available. Hinge means 25 are also plastic. Plastic permits lightweight construction as well as the use of any number of colors to match the color of the roof shingles. The gutter shield is preferably made of 5-foot sections which are about 5 inches wide. The mesh is one-eighth inch thick and the frame is one-fourth inch thick.

One of a series of gutter shield sections may be cut-down in length in order to meet the overall length of the gutter. Premolded sleeves (not shown) may be provided to cover the thusly formed jagged edges.

In one preferred embodiment alternating portions 27 and 29 of rod 23 are each approximately 1 inch long and, because they extend the entire length of the gutter shield, offer flexibility in positioning of the hinge means 25. Portions 27 have a diameter of one half inch and portions 29 are recessed 1/16 inch so that a 1/16 inch by 1 inch hinge means will fit smoothly in place.

The nail-like stops 41 are located one eighth inch from the edge of the mesh cover; are one half inch long; and 1/16 in diameter. These projections may be easily removed where they would otherwise interfere with gutter mounting straps or the like. They are spaced approximately 3 inches apart along the entire length of the outer edge of frame 19.

Alternatively, bent tabs 43 (FIG. 5) may be permanently secured to the outer edge of frame 19 or they may be temporarily secured as, for example, by sliding their ends into slits 44 provided along the length of the frame. Preferably these tabs are bent to form an angle of about 120 degrees. As will be noted below, the tabs 43 need only be used during installation which will now be described.

While on the ground, the installer snaps several of the hinge means along the length of rod 23. If permanent guide means are not provided, the installer also attaches guide tabs 43 or other similar guide means. Then, by means of guide projections 41, guide tabs 43, or other guide means along the edge of the outer frame 19, the gutter shield is accurately placed in position over the gutters and hinge straps 31 are secured to the roof. As already noted, the strap may be mounted by nails, adhesive, or any other suitable means; and it may be mounted either over or under the roof shingles.

The importance of the use of guide means at the outer edge of the mesh frame 19 is illustrated in FIG. 4 where a ladder 45 is shown resting against the gutter 11. Because the gutter shield is hinged along the roof at a position above the outer gutter edge, the shield swings outwardly to some extent (as shown by Arrow 46) when moved to a position 15' where it rest on the roof. It can be seen that, where the ladder 45 extends above the gutter edge 21, the outer edge of frame 19 must be set back from the outer edge of the gutter 11 when the shield is in its resting position. This restriction necessitates accurate placement of the hinge means during installation; and the necessary accuracy is obtained by the simple provision of guide means such as projections 41.

It can also be seen in FIG. 4, that, when the gutter shield is moved to position 15', it is completely independent of the gutter, thereby permitting servicing of the gutter without interference from the shield.

As already noted, the several recessed portions 29 along the length of rod 23 provide for flexibility during installation. The rod also serves another function as a break-water during heavy rains. In this regard, it should be understood that in prior gutter shields, a heavy flow of water from the roof would often flow over the shield rather than through it, particularly when the shield is partially covered with leaves, thereby limiting the usefulness of the gutter to be protected. By acting as a break-water, rod 23 virtually eliminates this overflow.

While the invention has been particularly shown and described with reference to preferred embodiments thereof, it will be understood by those skilled in the art that various changes in form and detail may be made therein without departing from the spirit and scope of the invention.

For example, although the rod member 23 has been described and illustrated as being fabricated from a single piece of plastic, many of the advantages of the invention can be obtained by using a more conventional structure wherein a separate rod is used as a hinge pin to join the straps 31 to loop portions such as 27 on the frame 19.

What is claimed is:

1. A gutter shield of the type comprising an elongated mesh cover positionable over a gutter, said mesh cover having a first side adjacent and parallel to a roof and a second side adjacent and parallel to the outer edge of said gutter, said gutter shield further comprising:
   hinge means attached to said first side of said mesh cover and fixed to said roof such that said mesh cover may be swung from a first position covering said gutter to a second position away from said gutter, said mesh cover being totally independent of said gutter in said second position, thereby permitting servicing of said gutter without interference from said mesh cover; and
   guide means attached to and extending from said second side of said mesh cover, said guide means extending adjacent said outer edge of said gutter and comprising a plurality of needle-like projections extending downward from said second side of said mesh cover to serve as position guide means for said second side of said mesh cover, such that said second side is positioned over but not beyond said outer edge, thereby permitting the positioning of a ladder against said gutter without interfering with the movement of said mesh cover.

2. The gutter shield of claim 1 wherein said guide means additionally comprises a plurality of guide tabs, said tabs extending beyond said outer edge of said gutter.

3. The gutter shield of claim 2 wherein said tabs are temporarily fixed to said second side, thereby permitting removal of said tabs after installation of said gutter shield.

4. The gutter shield of claim 1 wherein said first side of said mesh cover comprises a rod extending the length of said mesh cover and having recessed portions formed along the length thereof.

5. The gutter shield of claim 4 wherein said hinge means comprises at least one strap having a loop formed at one end thereof, said loop being clamped around a recessed portion of said rod.

6. The gutter shield of claim 4 wherein said hinge means comprises at least one strap having a loop formed at one end thereof, said loop being clamped around a recessed portion of said rod, said strap being provided with perforations at random throughout said strap so that said strap may be secured to the roof by adhesive means.

7. The gutter shield of claim 5 wherein said guide means additionally comprises a plurality of tabs extending beyond said outer edge of said gutter.

8. The gutter shield of claim 7 wherein said tabs are temporarily fixed to said second side, thereby permitting removal of said tabs after installation of said gutter shield.

9. The gutter shield of claim 4 wherein said guide means additionally comprises a plurality of tabs extending beyond said outer edge of said gutter.

10. The gutter shield of claim 9 wherein said tabs are temporarily fixed to said second side, thereby permitting removal of said tabs after installation of said gutter shield.

11. The gutter shield of claim 1 wherein said guide means are temporarily fixed to said second side, thereby permitting removal of said guide means after installation of said gutter shield.

* * * * *